(12) United States Patent
Kudo et al.

(10) Patent No.: US 9,662,741 B2
(45) Date of Patent: May 30, 2017

(54) METAL FORMING METHOD AND FORMED PRODUCT

(71) Applicant: UACJ CORPORATION, Tokyo (JP)

(72) Inventors: Tomoyuki Kudo, Tokyo (JP); Takashi Murase, Tokyo (JP); Takeshi Koshio, Tokyo (JP)

(73) Assignee: UACJ Corporation, Tokyo (JP)

( * ) Notice: Subject to any disclaimer, the term of this patent is extended or adjusted under 35 U.S.C. 154(b) by 124 days.

(21) Appl. No.: 14/361,811

(22) PCT Filed: Nov. 20, 2012

(86) PCT No.: PCT/JP2012/080018
§ 371 (c)(1),
(2) Date: May 30, 2014

(87) PCT Pub. No.: WO2013/080833
PCT Pub. Date: Jun. 6, 2013

(65) Prior Publication Data
US 2014/0376996 A1    Dec. 25, 2014

(30) Foreign Application Priority Data

Nov. 30, 2011    (JP) .................................. 2011-261637

(51) Int. Cl.
*B23K 37/00*    (2006.01)
*B23K 37/04*    (2006.01)
*B23K 31/00*    (2006.01)
*B23K 31/02*    (2006.01)
(Continued)

(52) U.S. Cl.
CPC .......... *B23K 20/023* (2013.01); *B21D 26/021* (2013.01); *B21D 26/023* (2013.01);
(Continued)

(58) Field of Classification Search
CPC .... B21D 53/78; B21D 26/021; B21D 26/049; B23K 20/02; B23K 20/023; B23K 3/04; B23K 1/19; B23K 2203/10
See application file for complete search history.

(56) References Cited

U.S. PATENT DOCUMENTS 3,470,605 A * 10/1969 Menne .................... B21C 37/09
228/143
3,795,041 A *  3/1974 Hennicke .................. H01J 9/26
228/121

(Continued)

FOREIGN PATENT DOCUMENTS

CN          1251286 A      4/2000
JP          59-229294      12/1984
(Continued)

OTHER PUBLICATIONS

Chinese Office Action issued in corresponding Chinese Patent App. No. 201280058885X, issued on Oct. 10, 2015 (with translation).
(Continued)

*Primary Examiner* — Erin Saad
(74) *Attorney, Agent, or Firm* — Greer Burns & Crain Ltd.

(57) ABSTRACT

The metal forming method includes deforming a member to be formed (2) that includes a second metal and that has been heated and bringing the member into contact with a member to be bonded (3) that includes a first metal and that has been heated, in which the temperature of the member to be bonded (3) is a temperature at which a liquid phase percentage in the member to be bonded (3) is from 5 to 35%.

18 Claims, 5 Drawing Sheets

(51) Int. Cl.
*B23K 20/02* (2006.01)
*B21D 26/023* (2011.01)
*B21D 26/055* (2011.01)
*B23K 20/16* (2006.01)
*B23K 1/20* (2006.01)
*B23K 20/00* (2006.01)
*B21D 26/021* (2011.01)
*B23K 20/24* (2006.01)
*B23K 20/14* (2006.01)
*B23K 20/233* (2006.01)
*B21D 37/16* (2006.01)
*B23K 101/04* (2006.01)
*B23K 103/10* (2006.01)
*B23K 103/14* (2006.01)

(52) U.S. Cl.
CPC .......... *B21D 26/055* (2013.01); *B21D 37/16* (2013.01); *B23K 1/203* (2013.01); *B23K 20/008* (2013.01); *B23K 20/14* (2013.01); *B23K 20/16* (2013.01); *B23K 20/233* (2013.01); *B23K 20/2333* (2013.01); *B23K 20/2336* (2013.01); *B23K 20/24* (2013.01); *B23K 2201/04* (2013.01); *B23K 2203/10* (2013.01); *B23K 2203/14* (2013.01); *Y10T 403/478* (2015.01)

(56) References Cited

U.S. PATENT DOCUMENTS

| | | | |
|---|---|---|---|
| 4,890,784 A | | 1/1990 | Bampton |
| 6,004,101 A | * | 12/1999 | Schilling ................. F01D 5/28 416/219 R |
| 6,119,924 A | | 9/2000 | Toi et al. |
| 6,206,631 B1 | * | 3/2001 | Schilling ............... F01D 21/045 415/173.4 |
| 2002/0033410 A1 | * | 3/2002 | Dziadosz ............... B21D 22/00 228/117 |
| 2002/0039664 A1 | * | 4/2002 | Magnusen ............. C22C 21/02 428/654 |
| 2011/0274555 A1 | * | 11/2011 | Iwasaki ................ B21D 26/021 416/241 R |

FOREIGN PATENT DOCUMENTS

| | | |
|---|---|---|
| JP | 61-007081 | 1/1986 |
| JP | 63-108970 | 5/1988 |
| JP | 03-243288 | 10/1991 |
| JP | 09-201668 | 8/1997 |
| JP | 11-092849 | 4/1999 |
| JP | 2001-500793 | 1/2001 |
| JP | 2001-121234 | 5/2001 |
| JP | 2003-048077 | 2/2003 |
| JP | 2006-239745 | 9/2006 |
| JP | 2009-226454 | 10/2009 |
| JP | 2009-291793 | 12/2009 |
| JP | 2010-094683 | 4/2010 |
| JP | EP 2390023 A1 * | 11/2011 ........... B21D 26/021 |

OTHER PUBLICATIONS

Int'l. Search Report, issued in Int'l. App. No. PCT/JP2012/080018, mailed Feb. 12, 2013.

Chinese Office Action issued in corresponding Chinese Patent App. No. 201280058885X, issued on May 24, 2016 (with translation).

* cited by examiner

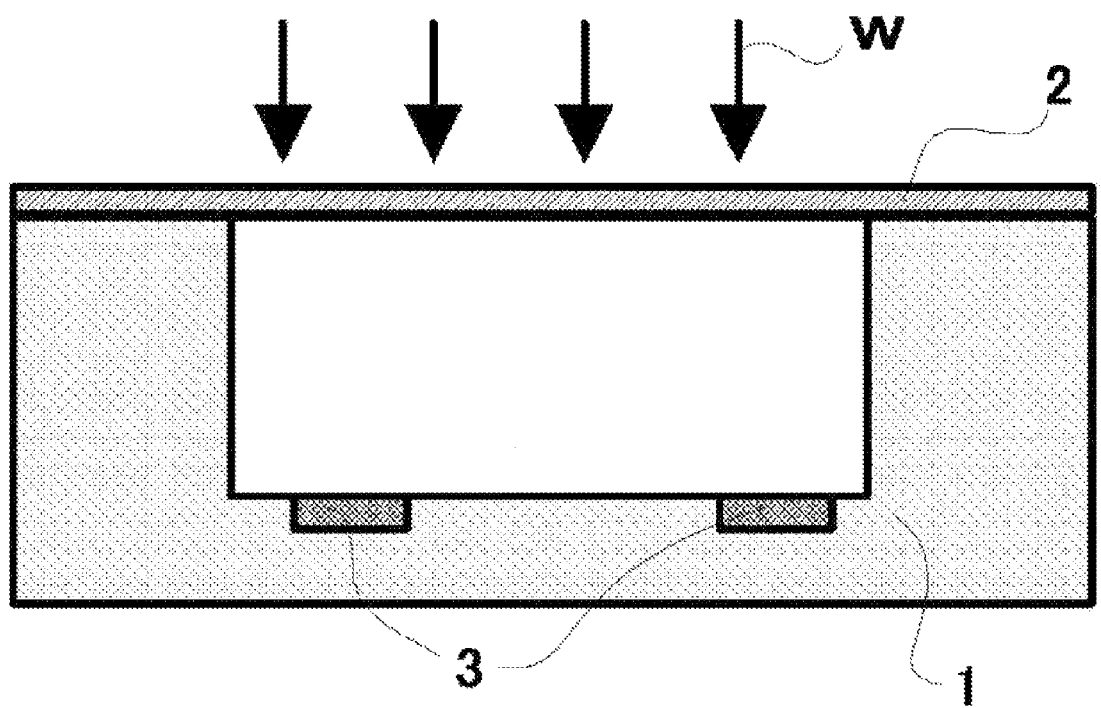
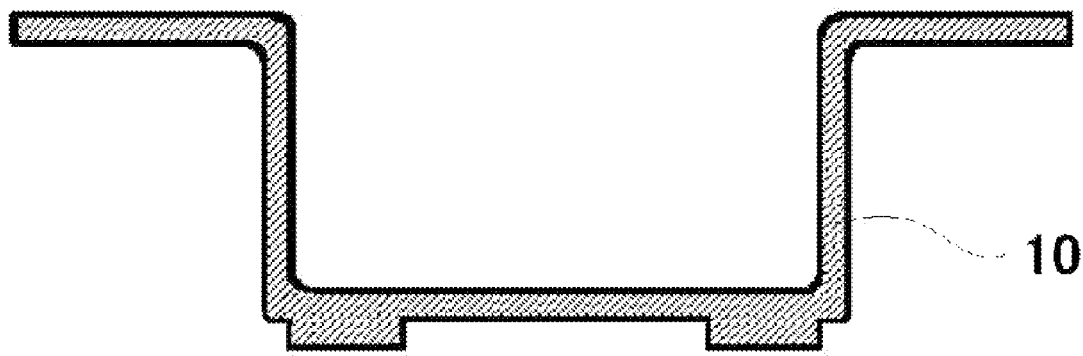

METAL FORMING METHOD AND FORMED PRODUCT

This application is being filed under §371 as a National Phase Application of International Application No. PCT/JP2012/080018, filed Nov. 20, 2012.

TECHNICAL FIELD

The present disclosure relates to a metal forming method that forms a member to be formed comprising a metal and a member to be bonded comprising a metal by hot forming, and to a formed product obtained by the method.

BACKGROUND ART

Many formed products of metal are produced by forming respective portions and then bonding the portions together by welding or the like in a later process. Meanwhile, some methods have been proposed to simultaneously perform hot forming and diffusion bonding by utilizing heat in the hot forming in order to reduce the number of processing steps or to obtain a composite formed product that cannot be produced by the method mentioned above.

For example, Patent Literature 1 proposes a method in which a metal member and an insert material are placed in a forging die with a temperature at which the metal member and the insert material become semi-molten to simultaneously perform forging and bonding, thereby obtaining an intermediate product, and then, another metal member and an insert material of the intermediate product are forged and bonded together at a temperature at which the other metal member and the insert material become semi-molten, as in the previous process, thereby obtaining a final product.

In addition, Patent Literature 2 proposes a method for performing blow forming and diffusion bonding by utilizing heating in the blow forming process. Blow forming is one of hot working processes for aluminum and used mainly in thin-plate processing. Some metals consisting of fine crystalline grains are known to cause superplastic deformation when deformed in a high temperature range and exhibit large extension of 100% or more. Blow forming is a forming method that utilizes the phenomenon, in which a metal plate member is pinched between dies heated to high temperature, then heated, and formed into a shape of the die by a high pressure gas such as nitrogen gas. Blow forming is advantageous in that when a material having favorable superplastic deformability is used for a metal plate member, cold press forming allows integral forming for a part whose shape is so complicated that forming thereof is extremely difficult. In Patent Literature 2, a plurality of plates are stacked on each other; then, regions of the plates desired to be bonded are heated and pressed by a blow forming die to be subjected to diffusion bonding, and, simultaneously, gas pressure is applied inside the blow forming die to perform blow forming, thereby forming a part with a hollow structure.

CITATION LIST

Patent Literature

Patent Literature 1: Unexamined Japanese Patent Application Kokai Publication No. 2001-121234.
Patent Literature 2: National Patent Publication No. 2001-500793.

SUMMARY OF INVENTION

Technical Problem

However, in the forming method described in Patent Literature 1, it is necessary that the two members to be bonded are both brought into semi-molten states and sufficiently pressurized to allow large deformation. Accordingly, the method has had a problem in that the members are damaged when the members are thin or tensile deformation occurs. In addition, the bonding of the two metal members requires an insert material, increasing production cost. Furthermore, the combined forming method utilizing blow forming and solid-phase diffusion bonding, the so-called SPF-DB process, described in Patent Literature 2 has been problematic in that a gap tends to be formed between the surfaces of the members coming in contact with each other. For this reason, an extremely large pressure has been required to reduce the gap between the surfaces thereof to be contacted to obtain a favorably bonded product, and regions that can be diffusion-bonded have been limited to those pinched between the dies and pressurized. Besides, solid-phase diffusion bonding requires a long time for bonding process, usually, a pressure retention time of about 30 minutes or longer. For example, in cases of using aluminum alloy material, a stable and strong oxide film is present on a surface thereof and inhibits diffusion. Therefore, it has been difficult to use solid-phase diffusion bonding to produce a highly reliable bonded member in a short time.

The present disclosure has been accomplished in view of the above circumstances. It is an objective of the present disclosure to provide a metal forming method that allows forming for obtaining a highly reliable bonded part in a short time and a formed product obtained by the method.

Solution to Problem

In order to achieve the above objective, a metal forming method according to a first aspect of the present disclosure is characterized by comprising:

deforming a member to be formed that comprises a second metal and that has been heated and bringing the member to be formed into contact with a member to be bonded that comprises a first metal and that has been heated, wherein a temperature of the member to be bonded is a temperature at which a liquid phase percentage in the member to be bonded is from 5 to 35%.

The metal forming method may comprise:

a first step of arranging at least one member to be bonded as the member to be bonded on a bottom surface of a die that has been heated;

a second step of placing the member to be formed across the die; and a third step of spraying a gas onto the member to be formed to deform a shape of the member to be formed so as to follow a shape of the die and bonding a part of a lower surface of the member to be formed and an upper surface of the member to be bonded, wherein, in the third step, a temperature of the member to be bonded may be a temperature at which a liquid phase percentage in the member to be bonded is from 5 to 35%.

A chloride-based flux may be applied on surfaces of the member to be formed and the member to be bonded that are to be brought into contact with each other; and an atmosphere of the third step may be an air atmosphere.

A fluoride-based flux may be applied on surfaces of the member to be formed and the member to be bonded that are to be brought into contact with each other; and an atmosphere of the third step may be a vacuum or non-oxidizing atmosphere.

An aluminum alloy used for the member to be bonded may have an Mg content of from 0.2 to 5.0% by mass; and an atmosphere of the third step may be a vacuum or non-oxidizing atmosphere.

In the first step, the member to be bonded may be arranged near a corner of the die.

Before the first step, a release agent may be applied on surfaces of the die and the member to be bonded that are to be brought into contact with each other.

At least one of the first metal or the second metal may be an aluminum alloy.

The aluminum alloy used for the member to be bonded may have an Si content of from 0.6 to 3.5% by mass.

The aluminum alloy used for the member to be bonded may have a Cu content of from 0.7 to 15.0% by mass.

A period of time during which the liquid phase percentage of the member to be bonded is from 5 to 35% after the contact between the member to be formed and the member to be bonded may be from 30 to 3600 seconds.

A temperature difference between a solidus temperature of the member to be bonded and a liquidus temperature of the member to be bonded may be from 10 to 200° C.

A metal formed product according to a second aspect of the present disclosure is characterized in that the product is obtained by forming by the metal forming method described above.

Advantageous Effects of Invention

The present disclosure can provide a metal forming method that allows forming for obtaining a highly reliable bonded part in a short time and a formed product obtained by the method.

BRIEF DESCRIPTION OF DRAWINGS

FIG. 1A is a schematic diagram showing a forming method according to an embodiment using blow forming;

FIG. 1B is a schematic diagram showing a formed product obtained by forming by the forming method shown in FIG. 1A;

DESCRIPTION OF EMBODIMENTS

As the results of intensive and extensive investigations, the present inventors have found that a member to be formed and a member to be bonded can be bonded together in a short time without requiring large pressure and a highly reliable formed product can be obtained without large deformation of the member to be bonded by generating liquid phases in the member to be bonded by using heating during hot working of the member to be bonded and then by utilizing the movement of the generated liquid phases to grain boundaries and a member surface, thereby accomplishing the present disclosure.

Hereinafter, a description will be given of a combined forming method and a formed product according to embodiments of the present disclosure.

FIG. 1A is a view showing a combined forming method according to an embodiment of the present disclosure using blow forming, and FIG. 1B is a view showing a formed product 10 obtained by forming by the combined forming method shown in FIG. 1A.

Figure 2A:
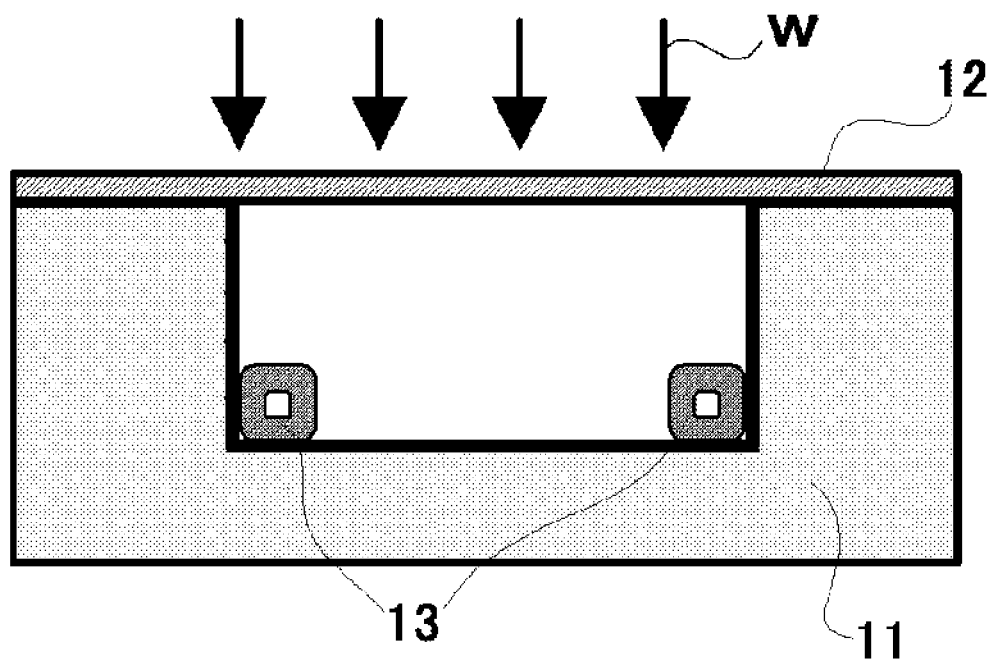
FIG. 2A is a schematic diagram showing a forming method according to an embodiment using blow forming.
Figure 2B:
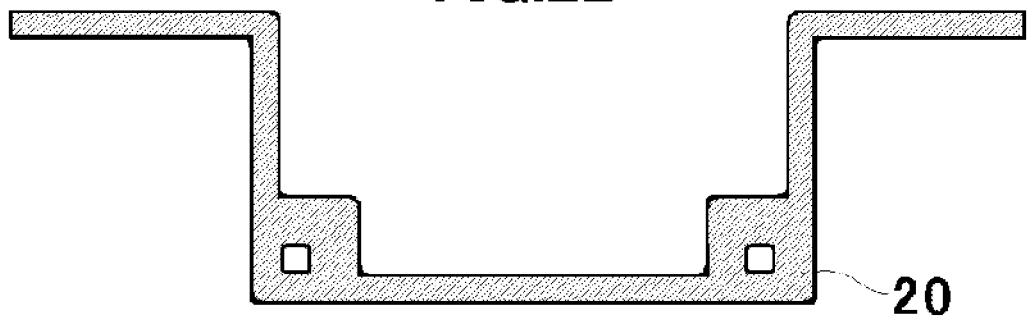
FIG. 2B is a schematic diagram showing a former product obtained by forming by the forming method shown in FIG. 2A.

Similarly, FIG. 2A is a view showing a combined forming method according to an embodiment of the present disclosure using blow forming, and FIG. 2B is a view showing a formed product 20 obtained by forming by the combined forming method shown in FIG. 2A.

Use of a hot working process, such as blow forming, hot press forming, or cast forming, can be considered as an example of the combined forming method according to embodiments of the present disclosure. Hereinbelow, an embodiment of the present disclosure using an example of blow forming will be described in detail.

As shown in FIG. 1A, a blow forming in the combined forming method of the embodiment of the disclosure is a method in which at least one member to be bonded 3 comprising a metal (a first metal) is arranged on a bottom surface of a heated die 1 (a first step); a member to be formed 2 comprising a metal (a second metal) is placed across the die 1 to be fixed in such a manner as to hold the member to be formed 2 between the die 1 and a top plate (not shown in the drawing) (a second step); and after heating the member to be formed 2, a high pressure gas is sprayed onto the member to be formed 2 in a direction toward the die 1 (a direction w) to deform a shape of the member to be formed 2 so as to follow a shape of the die 1; and a part of a lower surface of the member to be formed 2 is bonded to an upper surface of the member to be bonded 3 (a third step), thereby obtaining the formed product 10 (FIG. 1B).

Although metals used for the member to be formed 2 and the member to be bonded 3 are not limited to the following ones, for example, titanium alloy or aluminum alloy may be used. Titanium alloy exhibits excellent superplastic properties under high temperature and thus is advantageous in hot working, as well as is easily bonded since an oxide film on a surface thereof can be relatively easily removed. Accordingly, titanium alloy is suitable to the metal forming method according to embodiments of the present disclosure. Additionally, aluminum alloy also exhibits excellent superplastic properties under high temperature. However, since an oxide film on aluminum alloy is stable, the strong oxide film needs to be destroyed for performing bonding.

Although the aluminum alloy as the second metal used for the member to be formed 2 is not limited to the following ones, examples of the aluminum alloy to be used include an Al—Mg (—Mn) based aluminum alloy, am Al—Mg—Si based aluminum alloy, an Al—Cu based aluminum alloy, an Al—Zn—Mg based aluminum alloy, and an Al—Mn based aluminum alloy. Examples of the titanium alloy to be used include a Ti-6Al-4V titanium alloy. In addition, although the aluminum alloy as the first metal used for the member to be bonded 3 is not limited to those below, examples of the aluminum alloy to be used include an Al—Cu based aluminum alloy and an Al—Mg based aluminum alloy.

For example, in the combined forming method according to the embodiment of the present disclosure using blow forming, before blow forming, at least one member to be bonded 3 is arranged in advance in a predetermined position on a bottom surface of the heated die 1 corresponding to a portion to which the member to be bonded 3 is desired to be bonded in the formed product 10, as shown in FIG. 1A, and then a part of the lower surface of the member to be formed 2 is brought into contact with the upper surface of the member to be bonded 3 during the blow forming. A gap between the surfaces of the member to be formed 2 and the member to be bonded 3 in contact with each other is filled with liquid phases bleeding out from an inside of the member to be bonded 3, thereby resulting in bonding between the member to be formed 2 and the member to be bonded 3.

Figure 3:
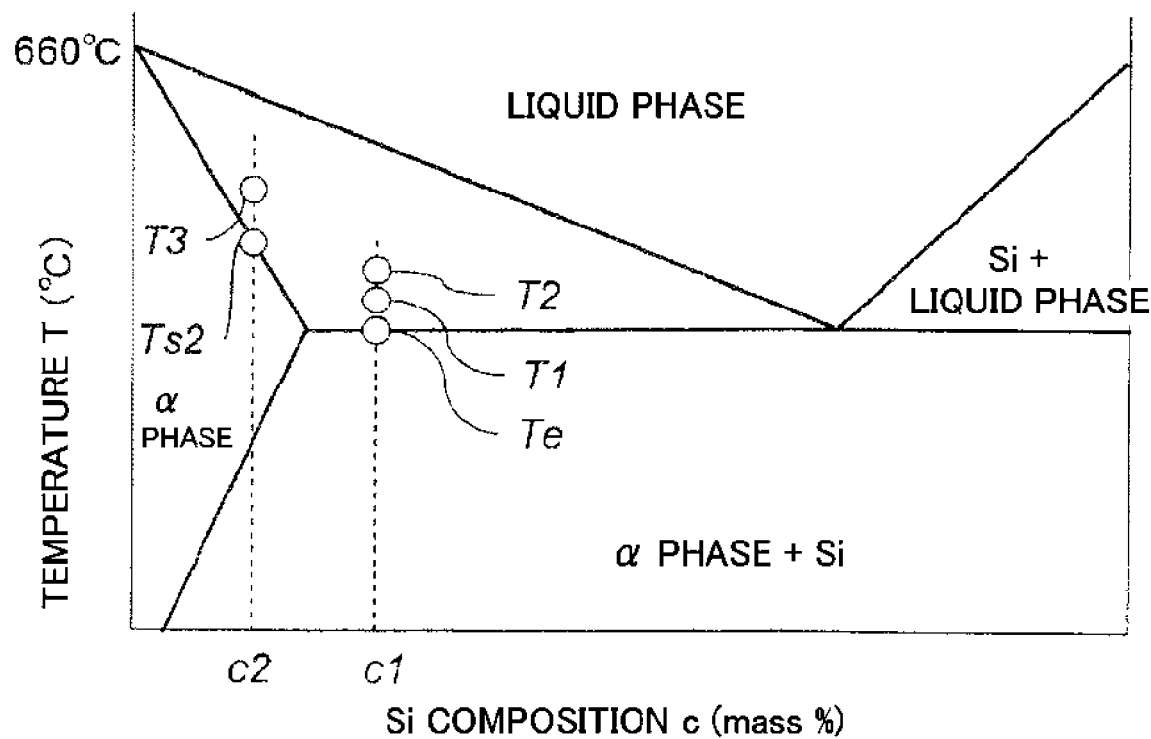
FIG. 3 is a view schematically showing a phase diagram of an Al—Si alloy.
Figure 4A:
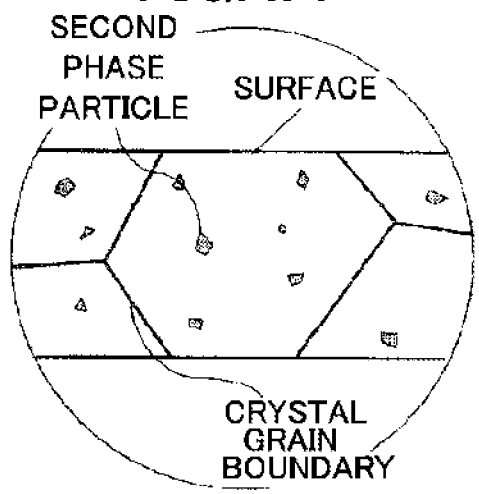
FIG. 4A is a view schematically showing grain boundaries in a metal member and the distribution of second phase particles in matrixes sectioned by the grain boundaries.
Figure 4B:
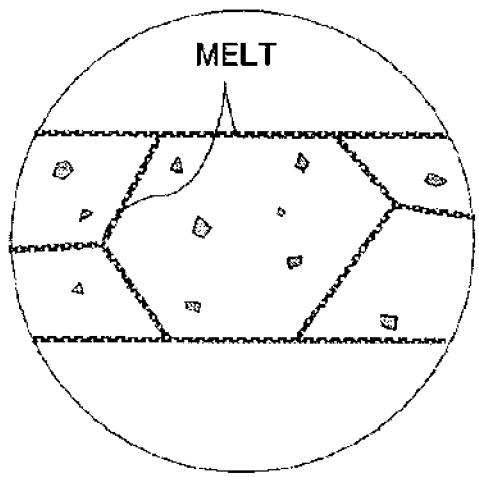
FIG. 4B is a view schematically showing that, first, the grain boundaries are molten.
Figure 4C:
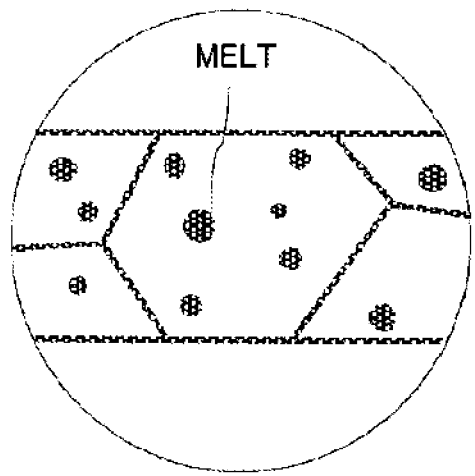
FIG. 4C is a view schematically showing that, next, second phase particles are molten.
Figure 4D:
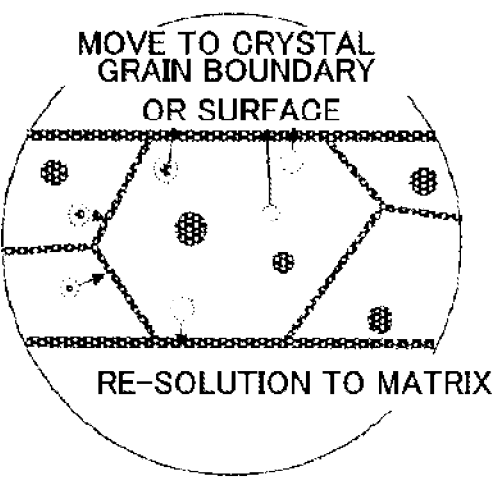
FIG. 4D is a view schematically showing the movement of liquid phases generated to the grain boundaries and the surface of the member.
Figure 5A:
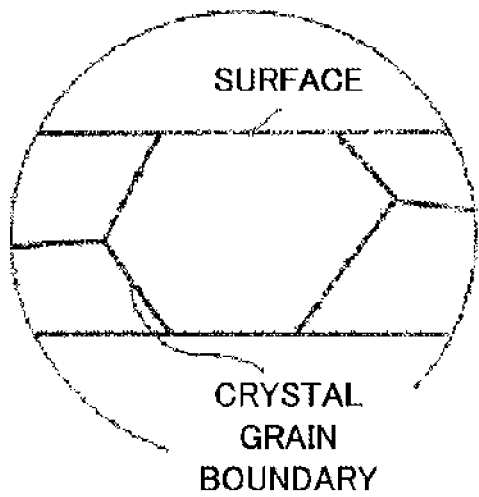
FIG. 5A is a view schematically showing grain boundaries in a metal member and a state in which no second phase particles are present in matrixes sectioned by the grain boundaries.
Figure 5B:
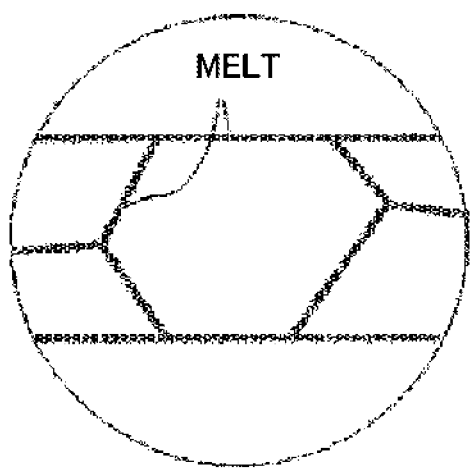
FIG. 5B is a view schematically showing that, first, the grain boundaries are molten.
Figure 5C:
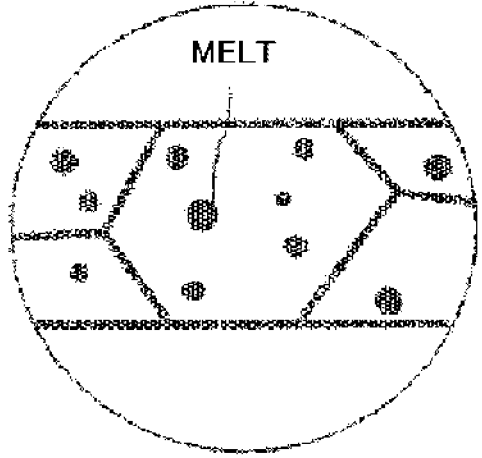
FIG. 5C is a view schematically showing that, next, the generation of liquid phases is locally beginning from spots with high solute element composition.
Figure 5D:
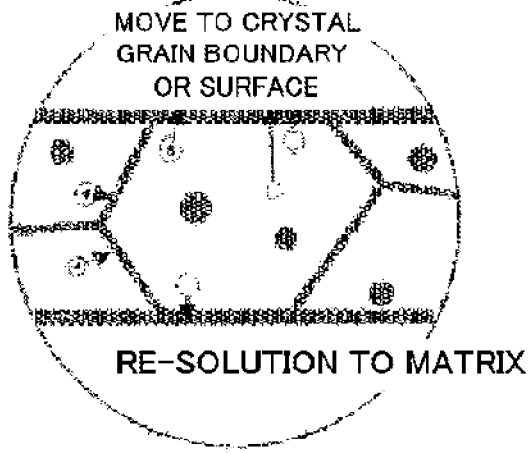
FIG. 5D is a view schematically showing the movement of the generated liquid phases to the grain boundaries and the surface of the member.

Now, a description will be given of a mechanism for generating liquid phases. FIG. 3 schematically shows a phase diagram of an Al—Si alloy as a typical binary eutectic alloy. When the aluminum alloy material having an Si composition of c1 is heated, liquid phase generation begins at a temperature T1 near a point exceeding a eutectic temperature (a solidus temperature) Te. At temperatures not higher than the eutectic temperature Te, second phase particles are distributed in matrixes sectioned by grain boundaries, as shown in FIG. 4A. When liquid phase generation begins here, grain boundaries having much segregation in the distribution of the second phase particles are melted into liquid phases, as shown in FIG. 4B. Next, as shown in FIG. 4C, second phase particles of Si as a main additive element component and peripheries of intermetallic compounds dispersed in the matrixes of the aluminum alloy are melted into spherical liquid phases. Furthermore, as shown in FIG. 4D, the spherical liquid phases generated in the matrixes are redissolved in the matrixes due to interfacial energy along with the elapse of time and the increase of temperature and move to the grain boundaries and the surface of the alloy due to in-solid phase diffusion. Then, as shown in FIG. 3, when the temperature increases to T2, the amount of the liquid phases increases as in the phase diagram. When the Si composition of one of the aluminum alloy materials is c2 that is smaller than a maximum solubility limit composition, as shown in FIG. 3, liquid phase generation begins near a point exceeding a solidus temperature Ts2. However, unlike the case of c1, in the tissue immediately before melting, no second phase particles may be present in the matrixes, as shown in FIG. 5A. In this case, first, grain boundaries are melted into liquid phases, as shown in FIG. 5B, and then, liquid phase generation begins at spots where solute element composition is locally high in the matrixes, as shown in FIG. 5C. As shown in FIG. 5D, the spherical liquid phases generated in the matrixes are redissolved in the matrixes due to interfacial energy along with the elapse of time and the increase of temperature and move to the grain boundaries and the surface of the alloy due to in-solid phase diffusion, as in the case of c1. When the temperature increases to T3, the amount of the liquid phases also increases, as seen in the phase diagram. As shown here, the bonding method according to the present disclosure utilizes the movement of liquid phases generated by partial melting in the metal member and can achieve both of bonding and shape retention.

As described above, the bonding method herein is characterized in that the first metal (the member to be bonded 3) is metal-bonded to the second metal (the member to be formed 2) by melting only a part of the inside of the first metal (the member to be bonded 3) and utilizing the movement of liquid phases to the metal surface. This method is, therefore, a novel bonding method that is different from the conventional bonding methods. In the present bonding method, during the bonding step, since only a part of the inside of the first metal is melted, the member to be bonded 3 comprising the first metal is not largely deformed, and not so large a pressure is required because the gap at a bonded interface is filled with the liquid phases moving to the surface, thereby obtaining a highly reliable bonded member (a formed product) in a short time. Furthermore, for example, various combinations of metals can be bonded without interposing an insert material therebetween, so that a first metal and a second metal that are of different compositions are bonded together.

In the embodiment of the present disclosure, in order to obtain a highly reliable bonded formed product 10, a mass percentage of liquid phases generated in the member to be bonded 3 by heating during hot working (a liquid phase percentage) needs to be from 5 to 35% with respect to a total mass of the member to be bonded 3. The liquid phase percentage herein is represented as follows:

Liquid phase percentage (%) =(a mass of liquid phases in the member to be bonded)/(a total mass of the member to be bonded)×100

A liquid phase percentage exceeding 35% leads to the generation of too many liquid phases (in other words, too few solid phases), and thus the member to be bonded 3 cannot retain the shape thereof, resulting in large deformation of the member to be bonded 3. On other hand, a liquid phase percentage of below 5% reduces the amount of the liquid phases supplied to the surface of the member to be bonded 3, making it difficult to bond the member to be bonded 3 and the member to be formed 2 together. Therefore, in the embodiment of the present disclosure, hot working is performed at a temperature at which a mass percentage of liquid phases in the member to be bonded 3 is from 5 to 35%. In addition, in the bonding according to the embodiment of the present disclosure, the liquid phase percentage is more preferably from 5 to 30%, and still more preferably from 10 to 20%.

It is extremely difficult to measure an actual liquid phase percentage during the boding between the member to be bonded 3 and the member to be formed 2 by heating the member to be bonded 3. Thus, herein, with the use of a phase diagram, the liquid phase percentage is provided by an equilibrium calculation using a metal composition and a bonding temperature. For example, liquid phase percentage is calculated from the composition of metal and a maximum attained temperature during heating (a bonding temperature) using thermodynamic equilibrium calculation software, such as Thermo-Calc (available from Thermo-Calc Software AB Company).

When using blow forming, in order to prevent the bonding between the die 1 and the member to be bonded 3, it is more preferable to apply a release agent on surfaces of the die 1 and the member to be bonded 3 that are to be brought into contact with each other, before performing the forming.

In addition, when using blow forming, in the embodiment of the present disclosure, a combination of an alloy composition of the member to be formed 2 and an alloy composition of the member to be bonded 3 and the temperature of hot working are selected as needed in a range where the advantageous effects of the present disclosure can be obtained, and are not particularly limited. However, since it is more preferable that while a part of the member to be bonded 3 is melted, the member to be formed 2 is not melted, a melting point of the member to be formed 2 is preferably higher than a melting point of the member to be bonded 3, and the temperature of blow forming is more preferably lower than the melting point of the member to be formed 2.

Additionally, the bonding between the member to be bonded 3 and the member to be formed 2 is further facilitated by destroying oxide films formed on surface layers of the member to be bonded 3 and the member to be formed 2 comprising the metals. In the embodiment of the present disclosure, the oxide films on the member to be bonded 3 and the member to be formed 2 can be easily destroyed by the deformation of the member to be formed 2 and friction between the bonded surfaces due to the contact between the member to be formed 2 and the member to be bonded 3. In addition, when a part of the inside of the member to be bonded 3 is melted and liquid phases bleed out to the surface of the member, the oxide film on the surface of the member to be bonded 3 is destroyed, thus facilitating bonding as compared to the conventional methods. In addition to that, particularly when using an aluminum alloy whose oxide film is stable, the oxide film may be destroyed by methods as below, although not limited thereto.

(1) Oxide Film Destruction by Flux

In the present destruction method, in order to destroy the oxide film, a flux is applied at least to portions of the member to be bonded 3 and the member to be formed 2 that are to be bonded together. Although the flux is not limited to the following ones, examples of the flux to be used include fluoride-based fluxes such as $KAlF_4$ and $CsAlF_4$ used for brazing of aluminum alloys. In bleed bonding, these fluxes are melted before the melting of the liquid phases in the member to be bonded 3 or before reaching a bonding temperature and react with oxide films formed on the surface layers of the member to be bonded 3 and the member to be formed 2 to destroy the oxide films Furthermore, in order to inhibit the formation of oxide films on the surface layers of the member to be bonded 3 and the member to be formed 2, the present method employs, for example, a method that bonds the member to be bonded 3 and the member to be formed 2 together in a vacuum atmosphere or a non-oxidizing atmosphere such as nitrogen gas or argon gas. The term "vacuum" used herein means not only a vacuum state but also a state in which there is almost no air inflow to the surfaces of the member to be bonded 3 and the member to be formed 2 that are to be bonded to each other such as surface bonding or bonding in a closed space. In addition, for example, when using a chloride-based flux such as KCl or NaCl, the member to be bonded 3 and the member to be formed 2 can be bonded together in an air atmosphere.

In addition, when using a fluoride-based flux, when the aluminum alloy of at least one of the member to be bonded 3 or the member to be formed 2 has an Mg content of 0.5% by mass or less, the fluoride-based flux and Mg react with each other, whereby the oxide film destruction effect of the fluoride-based flux can be much further improved. Therefore, in the use of a fluoride-based flux, both of the aluminum alloy forming the member to be bonded 3 and the aluminum alloy forming the member to be formed 2 still more preferably have an Mg content of 0.5% by mass or less.

(2) Oxide Film Destruction by Getter Action of Mg

When a predetermined amount of Mg is added in both aluminum alloys of the member to be bonded 3 and the member to be formed 2, the oxide films can be destroyed without applying any flux to the bonded portions between the member to be bonded 3 and the member to be formed 2, thereby further facilitating the bonding between the member to be bonded 3 and the member to be formed 2. This is because, in the case of the aluminum alloys containing a predetermined amount of Mg, when the aluminum alloys are melted and liquid phases come out to the surface layers, oxide films are destroyed by the getter action of Mg evaporating from the aluminum alloys, as in a vacuum fluxless brazing process. In the present method, since the getter action of Mg can be further enhanced by application of no flux, it is still more preferable to apply no flux.

In the destruction of oxide films by the getter action of Mg, bonding is preferably performed in a non-oxidizing atmosphere (such as nitrogen gas or argon gas) in order to inhibit the generation of an oxide film. Alternatively, the member to be bonded 3 and the member to be formed 2 are preferably bonded together in vacuum. For example, in a case of bonding the member to be bonded 3 and the member to be formed 2 by surface bonding or in a closed space, there occurs almost no oxygen inflow to the surfaces of the members to be bonded. Accordingly, even if an oxide film is grown due to an atmosphere very close to the member to be bonded 3 and the member to be formed 2, the oxide film grown has only a thickness that can be destroyed by the getter action of Mg, thus obtaining favorable bonding between the member to be bonded 3 and the member to be formed 2.

In order to destroy the oxide film by the getter action of Mg, the first aluminum alloy forming the member to be bonded 3 is preferably an aluminum alloy containing Mg of from 0.2 to 5.0% by mass. When the Mg content is 0.2% by mass or more, sufficient getter action is obtainable, so that more favorable bonding can be obtained. On the other hand, when the Mg content is 5.0% by mass or less, the amount of an oxide (MgO) generated by reaction of Mg with oxygen in the atmosphere on the surface of the bonded portion can be reduced, so that more favorable bonding can be obtained. The kind and the content of another element to be contained in the first aluminum alloy forming the member to be bonded 3 are selected as needed in a range where the advantageous effects of the present disclosure can be obtained.

In the bonding between the member to be bonded 3 and the member to be formed 2 according to the embodiment of the present disclosure, after destroying the oxide films on the bonded portions, liquid phases are filled between the member to be bonded 3 and the member to be formed 2 to bond the members together. The liquid phases are generated in the first metal forming the member to be bonded 3. In order to sufficiently fill the liquid phases between the bonded portions, a period of time during which the liquid phase percentage of the member to be bonded 3 is from 5 to 35% after the contact between the member to be bonded 3 and the member to be formed 2 is more preferably from 30 to 3600 seconds. When the period of time is 30 seconds or more, the liquid phases can be sufficiently filled, thereby resulting in more favorable bonding, and when the period of time is 3600 seconds or less, deformation of the member to be bonded 3 can more surely be inhibited. When, still more preferably, the period of time with a liquid phase percentage of 5% or more is from 60 to 1800 seconds, filling is more sufficiently performed, so that much more favorable bonding can be obtained and simultaneously change in the shape of the member to be bonded 3 can be more surely inhibited. In the bonding method according to the embodiment of the present disclosure, since the liquid phases move only in a region extremely near the bonded portions, the period of time necessary to fill the liquid phases is not dependent on the sizes of areas of the bonded portions.

In the bonding method according to the embodiment of the present disclosure, a difference between a solidus temperature and a liquidus temperature of the first metal generating the liquid phases is more preferably from 10 to 200° C. Liquid phase generation begins at a temperature exceeding the solidus temperature. However, when the difference between the solidus temperature and the liquidus temperature is 10° C. or higher, a temperature range in which solid and liquid coexist is enlarged, thereby further facilitating the control of the amount of liquid phases generated. Accordingly, the temperature difference is more preferably from 10 to 200° C., and a temperature difference between the solidus temperature and the liquidus temperature at which the liquid phase percentage is from 5 to 35% is still more preferably from 20 to 200° C. As the difference between the solidus temperature and the liquidus temperature becomes larger in a range where the advantageous effects of the embodiment of the disclosure can be obtained, the amount of liquid phases can be more easily controlled to an appropriately amount thereof.

Although a binary aluminum alloy having a composition satisfying the above numerical value range is not limited to the following ones, examples thereof include an Al—Si based alloy, an Al—Cu based alloy, an Al—Mg based alloy, an Al—Zn based alloy, and an Al—Ni based alloy. Examples of a binary titanium alloy include a Ti—Al based alloy. In order to satisfy the above numerical value range, such eutectic alloys as mentioned above are more advantageous since the above eutectic alloys have a larger solid-liquid coexisting region. However, for example, even with another alloy, such as a solid state-complete solubility type alloy, a pertitectic alloy, or a monotectic alloy, more favorable bonding can be achieved when the difference between the solidus temperature and the liquidus temperature is from 10 to 200° C. In addition, the above-mentioned binary alloys can also contain additive elements other than the main additive elements, so that ternary alloys, quaternary alloys, and even quinary or more multi-element alloys may be used. Although not limited to those mentioned below, examples of the multi-element alloys include an Al—Si—Mg based alloy, an Al—Si—Cu based alloy, an Al—Si—Zn base alloy, and Al—Si—Cu—Mg based alloy.

When using blow forming, the member to be bonded 3 can also be arranged in a predetermined position of the bottom surface of the die 1 corresponding to a portion that is desired to have large thickness due to a requirement for higher strength in the formed product 10. For example, an area of the formed product corresponding to the recess of the die in FIG. 1B is larger than an area of a portion of the member to be formed 2 not in contact with the die 1 (a portion thereof located above the recess of the die 1 and deformed) in FIG. 1A. Blow forming is bulging forming. Accordingly, since the member to be formed 2 is formed into a shape extended by blow forming, portions thereof positioned near corners of the die 1 tend to have a smaller plate thickness in the formed product 10 obtained after forming. Therefore, the strength of the formed product 10 after forming can be improved by arranging the member to be bonded 3 near the corners of the die 1 that are portions desired to be reinforced due to the smaller plate thickness in the formed product 10 after forming, as shown in FIG. 1A. The phrase "near the corners of the die" used herein encompasses not only the corners of the die but also a region of the die that tends to have a smaller plate thickness in the formed product 10.

In addition, in order to provide a design (designability) to a desired position of the formed product 10 after forming, for example, a name plate may be arranged on the bottom surface of the die 1 so that the name plate can be provided on the formed product 10 after forming. In this manner, the formed product 10 after forming can obtain a further three-dimensional and clearer design than a technique of relief-carving a name on the die 1.

In addition, for example, as shown in FIG. 2A, shape materials as a member to be bonded 13 may be arranged on a die 11 to be bonded with a member to be formed 12, whereby a formed product 20 with a hollow structure can be obtained, as shown in FIG. 2B.

The present disclosure is not limited to the above embodiments, and various modifications and applications can be made. For example, the embodiments described above have used the Al—Mg alloy as the aluminum alloy of the first metal forming the member to be bonded 3. However, an Al—Si alloy or an Al—Si—Mg alloy containing an Si element as an essential component may be used, or instead, an aluminum alloy having an Si content of from 0.6 to 3.5% by mass may be used. Having an Si content of 0.6% by mass or more can sufficiently ensure that there can be obtained the temperature range in which the liquid phase percentage of the member to be bonded 3 is from 5 to 35%, thereby allowing for more stable bonding. In addition, when the Si content is 3.5% by mass or less, the amount of liquid phases generated at the solidus temperature =the eutectic temperature is in a range sufficiently lower than 35% and higher than 5%, which further broadens a temperature range from the solidus temperature to a temperature at which the liquid phase percentage is 35%, thereby allowing for more stable bonding. In addition, a still more preferable Si content is from 1.2 to 3.0% by mass, whereby much more stable bonding can be obtained.

Moreover, an aluminum alloy material used to form the member to be bonded 3 may be an Al—Cu alloy or an Al—Cu—Mg alloy containing a Cu element as an essential component, or instead, may be an aluminum alloy having a Cu content Y (% by mass) of from 0.7 to 15.0% by mass. Having a Cu content of 0.7% by mass or more can sufficiently ensure that there can be obtained the temperature range in which the liquid phase percentage of the member to be bonded 3 is from 5 to 35%, thereby allowing for more stable bonding. In addition, when the Y is 15.0% by mass or less, the amount of liquid phases generated at the solidus temperature =the eutectic temperature is in a range sufficiently lower than 35% and higher than 5%, which further broadens a temperature range from the solidus temperature to a temperature at which the liquid phase percentage is 35%, thereby allowing for more stable bonding. In addition, a still more preferable Cu content is from 1.5 to 12.0% by mass, whereby much more stable bonding can be obtained.

EXAMPLES

Hereinafter, the present disclosure will be described in more detail by showing Examples using blow forming. The Examples below are no more than a single suitable example and do not limit the scope of the present disclosure.

First, an Al—Mg—Mn based aluminum alloy was used as a material for a member to be formed, and the respective aluminum alloys shown in Table 1 were used as a material for a member to be bonded. The member to be formed had a size of 300 mm×300 mm×2.0 mm, and the member to be bonded had a size of 30 mm×30 mm×5 mm. In Table 1, components other than Mg, Si, and Cu were the balance Al and inevitable impurities. In addition, in Table 1, the symbol "-" indicates that the component is not contained or the percentage of content thereof is extremely small.

TABLE 1

| Alloy No. | Alloy composition (% by mass) | | |
|---|---|---|---|
| | Mg | Si | Cu |
| 1 | 0.7 | — | 11 |
| 2 | — | — | 11 |
| 3 | 0.7 | — | 14 |
| 4 | 0.7 | — | 6 |
| 5 | 0.7 | 2.5 | 6 |
| 6 | 0.7 | 4 | 6 |
| 7 | 0.05 | — | 11 |
| 8 | 0.2 | — | 11 |
| 9 | 5.5 | — | 11 |
| 10 | 0.7 | 0.3 | 6 |
| 11 | 0.7 | 0.7 | 6 |
| 12 | 0.7 | 3.4 | 6 |
| 13 | 0.7 | — | 0.5 |
| 14 | 0.7 | — | 1 |
| 15 | 0.7 | — | 16 |

As shown in Table 2, Examples 1 to 4 and Comparative Examples 1 to 2 used an aluminum alloy of alloy No. 1; Examples 5 to 6, 11, and 12 used an aluminum alloy of alloy No. 2; Examples 7 to 10, respectively, used respective aluminum alloys of alloy Nos. 3 to 6; and Examples 13 to 21 used aluminum alloys of alloy Nos. 7 to 15.

The die used was a square cylindrical die having a size of 300 mm×300 mm×30 mm in depth. At a center of a bottom surface of the square cylindrical die was provided a recess having a size of 30 mm×30 mm×5 mm in depth. A release agent was applied on the entire bottom surface of the die. After heating the die, the member to be bonded was placed in the recess. Next, the member to be formed was placed across the die. Subsequently, a top plate was mounted on the member to be formed, whereby the member to be formed was held between the die and the top plate. Then, the member to be formed was blow-formed under forming conditions shown in Table 2.

Equilibrium liquid phase ratios shown in Table 2 are calculated values at respective forming temperatures obtained using Thermo-Calc (available from Thermo-Calc Software AB). Additionally, Table 2 shows a period of time during which the member to be bonded had a liquid phase percentage of from 5 to 35% after the contact between the member to be formed and the member to be bonded as "a period of time with a liquid phase ratio of from 5 to 35% (seconds)".

In Examples 1 to 3, 6 to 10, and 13 to 21 and Comparative Examples 1 to 2, no flux was applied on surfaces of the members to be bonded. In Examples 4 to 5 and 11, a potassium-fluoride based flux was applied on surfaces of the members to be bonded. In Example 12, a chloride-based flux was applied on surfaces of the members to be bonded. In Table 2, the symbol "-" represents cases with no flux applied, "F" represents cases with a potassium-fluoride based flux applied, and "Cl" represents cases with a chloride-based flux applied.

In Examples 1 to 10, 13 to 21, and Comparative examples 1 to 2, an atmosphere in the dies was a non-oxidizing atmosphere (nitrogen gas), and in Examples 11 to 12, an atmosphere in the dies was an air atmosphere. After blow forming, the formed products were taken out from the dies and checked whether the bonding between the member to be

TABLE 2

| No. | Alloy No. | Forming temperature (° C.) | Equilibrium liquid phase percentage (%) | Period of time with a liquid phase percentage of from 5% to 35% (Seconds) | Temperature difference between solidus temperature and liquidus temperature (° C.) | Flux | Atmosphere | Bonding | Deformation |
|---|---|---|---|---|---|---|---|---|---|
| Ex. 1 | 1 | 560 | 27.8 | 400 | 99 | — | Non-oxidizing | A | A |
| Ex. 2 | 1 | 560 | 27.8 | 25 | 99 | — | Non-oxidizing | B | A |
| Ex. 3 | 1 | 560 | 27.8 | 3700 | 99 | — | Non-oxidizing | A | B |
| Ex. 4 | 1 | 560 | 27.8 | 400 | 99 | F | Non-oxidizing | B | A |
| Ex. 5 | 2 | 580 | 34.5 | 400 | 84 | F | Non-oxidizing | A | A |
| Ex. 6 | 2 | 580 | 34.5 | 400 | 84 | — | Non-oxidizing | B | A |
| Ex. 7 | 3 | 550 | 34.5 | 400 | 82 | — | Non-oxidizing | A | A |
| Ex. 8 | 4 | 580 | 13.3 | 400 | 107 | — | Non-oxidizing | A | A |
| Ex. 9 | 5 | 530 | 17.0 | 400 | 114 | — | Non-oxidizing | A | A |
| Ex. 10 | 6 | 530 | 18.0 | 400 | 104 | — | Non-oxidizing | B | A |
| Ex. 11 | 2 | 580 | 34.5 | 400 | 84 | F | Air | B | A |
| Ex. 12 | 2 | 580 | 34.5 | 400 | 84 | Cl | Air | A | A |
| Ex. 13 | 7 | 580 | 34.0 | 400 | 83 | — | Non-oxidizing | B | A |
| Ex. 14 | 8 | 580 | 34.5 | 400 | 87 | — | Non-oxidizing | A | A |
| Ex. 15 | 9 | 520 | 34.0 | 400 | 84 | — | Non-oxidizing | B | A |
| Ex. 16 | 10 | 530 | 5.0 | 400 | 120 | — | Non-oxidizing | A | A |
| Ex. 17 | 11 | 530 | 6.0 | 400 | 123 | — | Non-oxidizing | A | A |
| Ex. 18 | 12 | 530 | 17.0 | 400 | 109 | — | Non-oxidizing | A | A |
| Ex. 19 | 13 | 580 | 10.0 | 400 | 101 | — | Non-oxidizing | B | A |
| Ex. 20 | 14 | 630 | 7.0 | 400 | 16 | — | Non-oxidizing | A | A |
| Ex. 21 | 15 | 530 | 7.0 | 400 | 88 | — | Non-oxidizing | B | A |
| Comp. Ex. 1 | 1 | 580 | 38.8 | 400 | 99 | — | Non-oxidizing | B | C |
| Comp. Ex. 2 | 1 | 530 | 2.0 | 400 | 99 | — | Non-oxidizing | C | B | bonded and the member to be formed was highly reliable or not and the member to be bonded was deformed or not. The experimental results are shown below. In Table 2, the symbol "A" in the column of bonding represents very favorable bonding; the symbol "B" therein represents favorable bonding; and the symbol "C" therein represents no favorable bonding. In addition, the symbol "A" in the column of deformation represents that the member to be bonded was not deformed; the symbol "B" therein represents that the member to be bonded substantially retained the shape thereof; and the symbol "C" therein represents that the member to be bonded was deformed.

In Examples 1, 5, 7 to 9, 12, 14, 16 to 18, and 20, very favorable bonding was obtained, and the members to be bonded were not deformed.

In Examples 2, 4, 6, 10 to 11, 13, 15, 19, and 21, favorable bonding was obtained, and the members to be bonded were not deformed.

In Example 3, very favorable bonding was obtained, and the member to be bonded substantially retained the shape thereof.

On the other hand, Comparative Example 1 had an equilibrium liquid phase ratio of 38.8% (exceeding 35%), resulting in the deformation of the member to be bonded. In addition, Comparative Example 2 had an equilibrium liquid phase percentage of 2.0% (below 5%) due to an extremely low forming temperature, thus resulting in no favorable bonding.

As shown above, it has been demonstrated that the present disclosure is a combined forming method suitable to blow forming. However, it is obvious that the present disclosure is not limited thereto and effective to various hot working processes. Additionally, as described above, the present disclosure is the forming method that is particularly effective when aluminum alloy or titanium alloy is employed. However, since the present disclosure is achieved by the control of equilibrium liquid phase percentage, obviously, the disclosure is not limited to the above metals and can employ other metals.

Having described and illustrated the principles of this disclosure by reference to one or more preferable embodiments, it should be apparent that the preferable embodiments may be modified in arrangement and detail without departing from the principles disclosed herein and that is intended that the disclosure be construed as including all such modifications and variations insofar as they come within the spirit and scope of the subject matter disclosed herein.

(Supplementary Note 1)

An aluminum alloy forming method that forms an aluminum alloy using a die, comprising:

a first step of arranging at least one member to be bonded that comprises a first aluminum alloy on a bottom surface of the die that has been heated;

a second step of placing a plate to be formed that comprises a second aluminum alloy across the die; and a third step of spraying a gas onto the plate to be formed to change a shape of the plate to be formed so as to follow a shape of the die and bonding a part of a lower surface of the plate to be formed and an upper surface of the member to be bonded, wherein, in the third step, a temperature of the member to be bonded is a temperature at which a liquid phase percentage in the member to be bonded is from 5 to 35%.

(Supplementary Note 2)

The aluminum alloy forming method according to the Supplementary Note 1, wherein a chloride-based flux is applied on surfaces of the plate to be formed and the member to be bonded that are to be brought into contact with each other; and an atmosphere of the third step is an air atmosphere.

(Supplementary Note 3)

The aluminum alloy forming method according to the Supplementary Note 1, wherein a fluoride-based flux is applied on surfaces of the plate to be formed and the member to be bonded that are to be brought into contact with each other; and an atmosphere of the third step is a vacuum or non-oxidizing atmosphere.

(Supplementary Note 4)

The aluminum alloy forming method according to the Supplementary Note 1, wherein the member to be bonded has an Mg content of from 0.2 to 5.0% by mass; and an atmosphere of the third step is a vacuum or non-oxidizing atmosphere.

(Supplementary Note 5)

The aluminum alloy forming method according to any one of the Supplementary Notes 1 to 4, wherein a period of time during which the liquid phase percentage of the first aluminum alloy is from 5 to 35% is from 30 to 3600 seconds.

(Supplementary Note 6)

The aluminum alloy forming method according to any one of the Supplementary Notes 1 to 5, wherein the first aluminum alloy has an Si content of from 0.6 to 3.5% by mass.

(Supplementary Note 7)

The aluminum alloy forming method according to any one of the Supplementary Notes 1 to 6, wherein the first aluminum alloy has a Cu content of from 0.7 to 15.0% by mass.

(Supplementary Note 8)

The aluminum alloy forming method according to any one of the Supplementary Notes 1 to 7, wherein a temperature difference between a solidus temperature of the member to be bonded and a liquidus temperature of the member to be bonded is from 10 to 200° C.

(Supplementary Note 9)

The aluminum alloy forming method according to any one of the Supplementary Notes 1 to 8, wherein in the first step, the member to be bonded is arranged near at least one corner of the die.

(Supplementary Note 10)

The aluminum alloy forming method according to any one of the Supplementary Notes 1 to 9, wherein before the first step, a release agent is applied on surfaces of the die and the member to be bonded that are to be brought into contact with each other.

(Supplementary Note 11)

An aluminum alloy formed product characterized in that:

the product is obtained by forming by the aluminum alloy forming method according to any one of the Supplementary Notes 1 to 10.

CROSS-REFERENCE TO RELATED APPLICATION)

The present disclosure is based on Japanese Patent Application No. 2011-261637 filed on Nov. 30, 2011, the entire specification, claims, and drawings of which are incorporated herein by reference.

REFERENCE SIGNS LIST

1. Die
2. Member to be formed

3. Member to be bonded
10. Formed product
11. Die
12. Member to be formed
13. Member to be bonded
20. Formed product
c Si composition
c1 Si composition
c2 Si composition
T Temperature
T1 Temperature exceeding Te
T2 Temperature further higher than T1
T3 Temperature exceeding Ts2
Te Solidus temperature
Ts2 Solidus temperature

The invention claimed is:

1. A metal forming method for forming a second member comprising a second metal to be in contact with at least one first member comprising an aluminum alloy so that the at least one first member is bonded to the formed second member, the metal forming method comprising:
   a first step of arranging the at least one first aluminum alloy member on a bottom surface in a cavity of a die that has been heated to a bonding temperature at which a liquid phase percentage in the at least one first aluminum alloy member is from 5 to 35%;
   a second step of placing the second member over the top surface of the die and over the cavity of the die; and
   a third step of spraying a gas onto the second member to deform a shape of the second member so that the second member follows a shape of the cavity of the die and bonding a part of a lower surface of the second member and an upper surface of the at least one first aluminum alloy member having the bonding temperature.

2. The metal forming method according to claim 1, wherein
   a chloride-based flux is applied on surfaces of the second member and the at least one first aluminum alloy member that are to be brought into contact with each other; and
   an atmosphere of the third step is an air atmosphere.

3. The metal forming method according to claim 1, wherein
   a fluoride-based flux is applied on surfaces of the second member and the at least one first aluminum alloy member that are to be brought into contact with each other; and
   an atmosphere of the third step is a vacuum or non-oxidizing atmosphere.

4. The metal forming method according to claim 1, wherein
   the aluminum alloy used for at least one first aluminum alloy member has an Mg content of from 0.2 to 5.0% by mass; and
   an atmosphere of the third step is a vacuum or non-oxidizing atmosphere.

5. The metal forming method according to claim 1, wherein
   in the first step, the at least one first aluminum alloy member is arranged near a corner of the die.

6. The metal forming method according to claim 1, wherein
   before the first step, a release agent is applied on surfaces of the die and the at least one first aluminum alloy member that are to be brought into contact with each other.

7. The metal forming method according to claim 1, wherein the second metal is an aluminum alloy.

8. The metal forming method according to claim 1, wherein the aluminum alloy used for the at least one first aluminum alloy member has an Si content of from 0.6 to 3.5% by mass.

9. The metal forming method according to claim 1, wherein the aluminum alloy used for the at least one first aluminum alloy member has a Cu content of from 0.7 to 15.0% by mass.

10. The metal forming method according to claim 1, wherein
    a period of time during which the liquid phase percentage of the at least one first aluminum alloy member is from 5 to 35% after the contact between the second member and the at least one first aluminum alloy member is from 30 to 3600 seconds.

11. The metal forming method according to claim 1, wherein
    a temperature difference between a solidus temperature of the at least one first aluminum alloy member and a liquidus temperature of the at least one first aluminum alloy member is from 10 to 200° C.

12. The metal forming method according to claim 2, wherein
    the aluminum alloy used for the at least one first aluminum alloy member has an Mg content of from 0.2 to 5.0% by mass; and
    an atmosphere of the third step is a vacuum or non-oxidizing atmosphere.

13. The metal forming method according to claim 3, wherein
    an aluminum alloy used for the at least one first aluminum alloy member has an Mg content of from 0.2 to 5.0% by mass; and
    an atmosphere of the third step is a vacuum or non-oxidizing atmosphere.

14. The metal forming method according to claim 1, wherein
    the second metal is an aluminum alloy.

15. The metal forming method according to claim 1, wherein
    the aluminum alloy used for the at least one first aluminum alloy member has an Si content of from 0.6 to 3.5% by mass.

16. The metal forming method according to claim 1, wherein
    the aluminum alloy used for the at least one first aluminum alloy member has a Cu content of from 0.7 to 15.0% by mass.

17. The metal forming method according to claim 1, wherein
    a period of time during which the liquid phase percentage of the at least one first aluminum alloy member is from 5 to 35% after the contact between the second member and the at least one first aluminum alloy member is from 30 to 3600 seconds.

18. The metal forming method according to claim 1, wherein
    a temperature difference between a solidus temperature of the at least one first aluminum alloy member and a liquidus temperature of the at least one first aluminum alloy member is from 10 to 200° C.

* * * * *